United States Patent
Hsu et al.

(10) Patent No.: US 8,120,586 B2
(45) Date of Patent: Feb. 21, 2012

(54) ELECTRONIC DEVICES WITH TOUCH-SENSITIVE NAVIGATIONAL MECHANISMS, AND ASSOCIATED METHODS

(75) Inventors: Chih-Feng Hsu, Taoyuan (TW); Yih-Feng Kao, Taoyuan (TW); John C. Wang, Taoyuan (TW)

(73) Assignee: HTC Corporation, Taoyuan (TW)

(*) Notice: Subject to any disclaimer, the term of this patent is extended or adjusted under 35 U.S.C. 154(b) by 950 days.

(21) Appl. No.: 11/850,573

(22) Filed: Sep. 5, 2007

(65) Prior Publication Data

US 2008/0284741 A1 Nov. 20, 2008

(30) Foreign Application Priority Data

May 15, 2007 (TW) .............................. 96117204 A
May 15, 2007 (TW) .............................. 96117205 A
May 15, 2007 (TW) .............................. 96117206 A

(51) Int. Cl.
   *G06F 3/041* (2006.01)
(52) U.S. Cl. ........................................ 345/173; 715/700
(58) Field of Classification Search .......... 345/156–184; 710/1–74; 178/18.01–19.07; 708/131; 715/700–711
See application file for complete search history.

(56) References Cited

U.S. PATENT DOCUMENTS

| | | | |
|---|---|---|---|
| 5,495,566 A * | 2/1996 | Kwatinetz | 715/785 |
| 5,594,471 A | 1/1997 | Deeran et al. | |
| 6,628,269 B2 | 9/2003 | Shimizu | |
| 6,774,890 B2 | 8/2004 | Engholm | |
| 7,061,474 B2 | 6/2006 | Hinckley et al. | |
| 7,119,797 B2 | 10/2006 | Kawano et al. | |
| 7,142,205 B2 | 11/2006 | Chithambaram et al. | |
| 7,173,637 B1 * | 2/2007 | Hinckley et al. | 345/684 |
| 7,190,348 B2 | 3/2007 | Kennedy et al. | |
| 7,349,822 B2 | 3/2008 | Sachs et al. | |
| 7,408,538 B2 | 8/2008 | Hinckley et al. | |
| 7,663,609 B2 | 2/2010 | Miyata et al. | |
| 2003/0122787 A1 * | 7/2003 | Zimmerman et al. | 345/173 |
| 2004/0178997 A1 * | 9/2004 | Gillespie et al. | 345/173 |
| 2007/0097093 A1 * | 5/2007 | Ohshita et al. | 345/173 |
| 2007/0146337 A1 * | 6/2007 | Ording et al. | 345/173 |

FOREIGN PATENT DOCUMENTS

| | | |
|---|---|---|
| CN | 1416068 | 5/2003 |
| CN | 1815428 | 8/2006 |
| CN | 101206544 | 6/2008 |
| EP | 1657628 | 5/2006 |
| WO | WO-99/28811 | 6/1999 |
| WO | WO-03/023593 | 3/2003 |

\* cited by examiner

*Primary Examiner* — Amr Awad
*Assistant Examiner* — Liliana Cerullo
(74) *Attorney, Agent, or Firm* — Perkins Coie LLP

(57) ABSTRACT

Electronic devices with preselected operational characteristics and associated methods are disclosed. The electronic devices can include a sensing component that senses a touch from an input mechanism and an input circuitry that measures at least one parameter of the touch from the sensing component. The electronic devices can also include a processor that performs an analysis of the measured at least one parameter of the detected touch and causes the user interface to navigate on the display based on the performed analysis.

18 Claims, 8 Drawing Sheets

ELECTRONIC DEVICES WITH TOUCH-SENSITIVE NAVIGATIONAL MECHANISMS, AND ASSOCIATED METHODS

CROSS-REFERENCE TO RELATED APPLICATION

This application claims priority to Taiwanese Patent Application No 096117204, filed May 15, 2007, Taiwanese Patent Application No 096117206, filed May 15, 2007, and Taiwanese Patent Application No 096117205, filed May 15, 2007, the disclosures of which are incorporated herein by reference in its entirety.

TECHNICAL FIELD

The present disclosure relates to electronic devices having touch-sensitive navigational mechanisms and associated methods.

BACKGROUND

Today's handheld electronic devices tend to have an increasing number of built-in features. For accessing these built-in features, jog wheels, touch pads, track balls, hotkeys, and/or other input devices have been placed on the electronic devices. However, these input devices typically occupy a large surface area on the electronic devices, and thus prevent the continued size reduction of the electronic devices. Also, a user typically has to press multiple input devices to complete an input task during use. Such operation can be laborious and can reduce the user's satisfaction with operating the electronic devices.

DETAILED DESCRIPTION

A. Overview

The present disclosure describes electronic devices with touch-sensitive navigational mechanisms and associated methods. It will be appreciated that several of the details set forth below are provided to describe the following embodiments in a manner sufficient to enable a person skilled in the relevant art to make and use the disclosed embodiments. Several of the details and features described below, however, may not be necessary to practice certain embodiments of the invention. Additionally, the invention can include other embodiments that are within the scope of the claims but are not described in detail with respect to FIGS. 1-8.

One aspect of the present disclosure is directed to an electronic device that includes a display, a sensing component that senses a touch from an input mechanism, and an input circuitry that measures at least one parameter of the touch via the sensing component. For example, the input circuitry can measure a position, a duration, a pressure, a temperature, and/or other parameters of the touch as a function of time. The electronic device can also include a processor that performs an analysis of the measured at least one parameter of the detected touch and causes a user interface on the display to navigate based on the performed analysis. For example, the processor can calculate a positional change of the touch during a preselected time period and interpret the touch as different navigational inputs based on the calculated positional change.

Another aspect of the present disclosure is directed to a method for operating an electronic device that includes measuring at least one parameter of a detected touch from an input mechanism on a sensing component of the electronic device. Then, an analysis is performed based on the measured at least one parameter of the detected touch from the input mechanism. The analysis can include determining whether a duration of the touch and/or a positional change of the touch exceeds a threshold. Based on the analysis, the user interface can be caused to navigate on a display of the electronic device. For example, the user interface can be caused to pan, continuously pan, scroll, and/or perform other navigational functions.

B. Electronic Devices with Touch-sensitive Navigational Mechanisms

Figure 1:
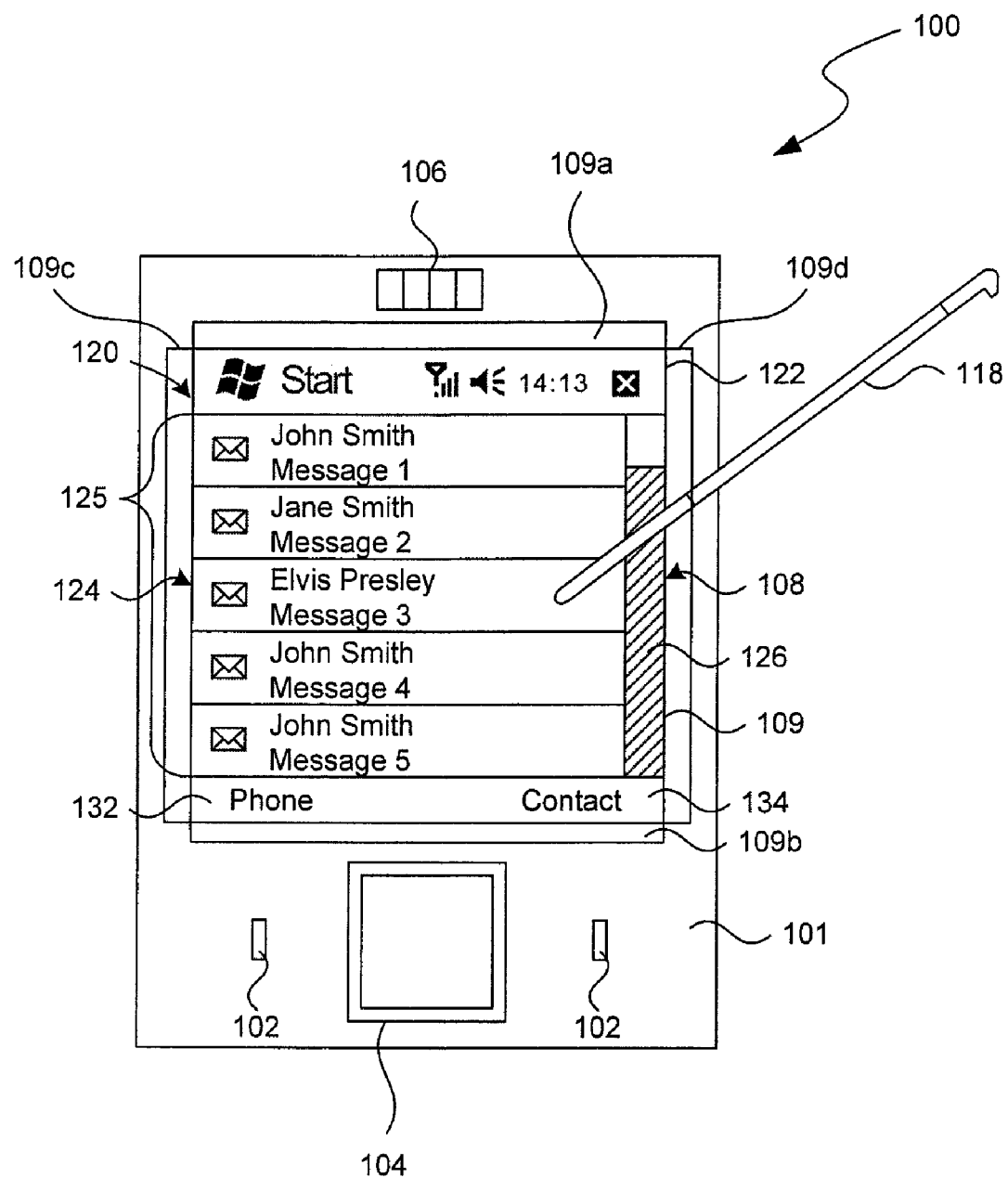
FIG. 1 is a front view of an electronic device having touch-sensitive navigational mechanisms and configured in accordance with an embodiment of the invention.
Figure 2:
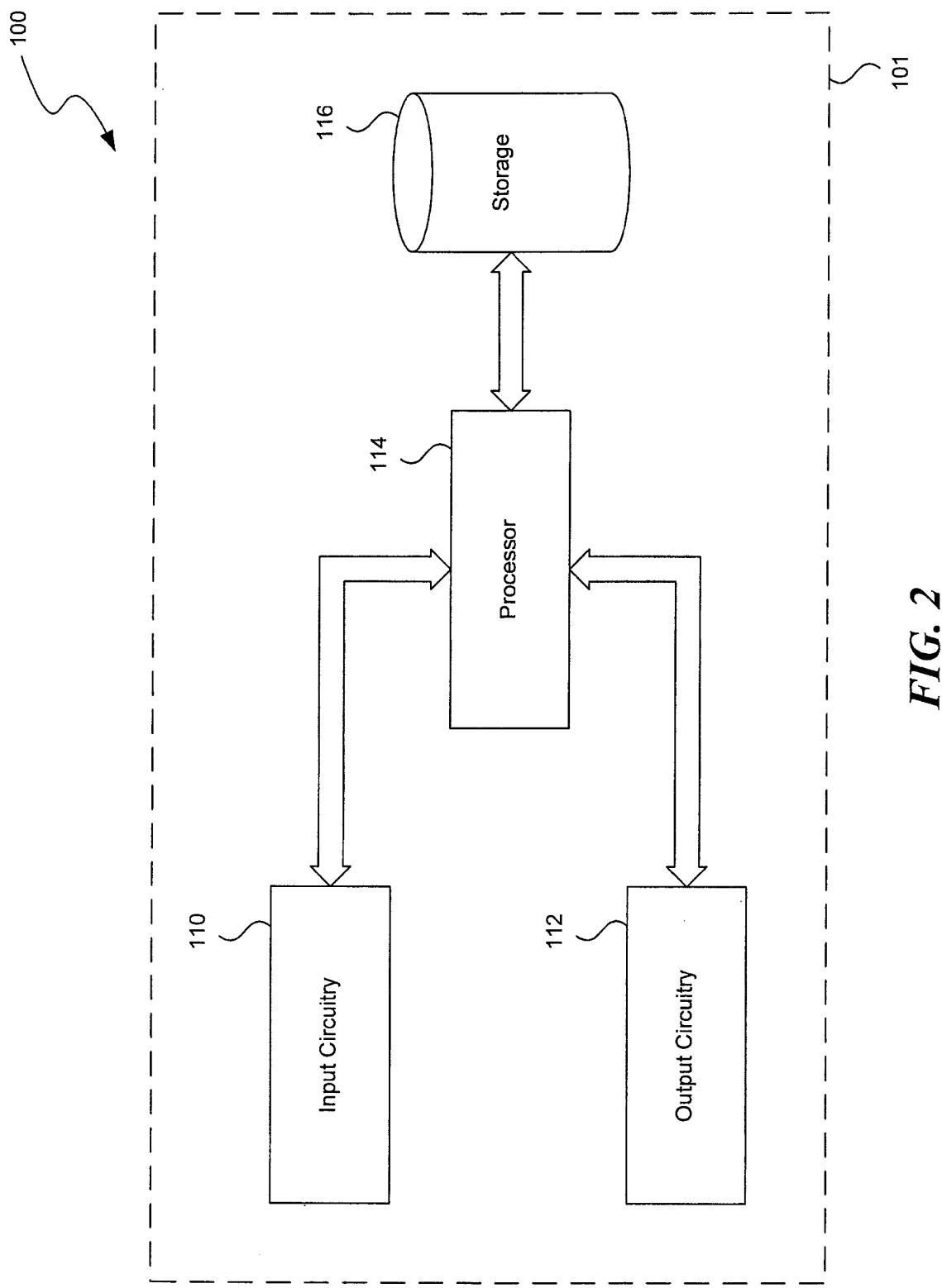
FIG. 2 is a functional schematic view of internal components of the electronic device in FIG. 1.

One embodiment of an electronic device 100 with touch-sensitive navigational mechanisms is described below with reference to FIGS. 1 and 2. FIG. 1 is a front view of the electronic device 100, and FIG. 2 is a functional schematic view of internal components of the electronic device 100 of FIG. 1.

As shown in FIG. 1, the electronic device 100 can include a housing 101 and a display 108 carried by the housing 101. The display 108 can include a liquid-crystal display (LCD), a plasma display, a vacuum fluorescent display, a light-emitting diode (LED) display, a field emission display, and/or other suitable types of display configured to present a user interface 120. The user interface 120 can include text and/or graphical images representing windows, programs, operational options, messages, files, fields, dialog boxes, menu items, icons, buttons, and/or cursors. For example, as illustrated in FIG. 1, the user interface 120 can include a status bar 122, a message list 124 showing a plurality of email messages 125, and a scroll bar 126 for the message list 124. The user interface 120 can also include a first soft key 132 (e.g., for "Phone"), a second soft key 134 (e.g., for "Contact"), and/or other soft keys.

The electronic device 100 can also include a sensing component 109 configured to receive input from a user via, e.g., a stylus 118, a finger of the user (not shown), and/or other input mechanisms. The sensing component 109 can include a resistive, capacitive, infrared, surface acoustic wave, and/or other types of touch screen. The sensing component 109 can be integrated with the display 108 or can be independent from the display 108. The sensing component 109 can include boundary portions that extend beyond the display 108. For example, as shown in FIG. 1, the sensing component 109 includes boundary portions 109a-d extending beyond the display 108. In certain embodiments though, at least one of the boundary portions 109a-d can be omitted.

As illustrated in FIG. 1, the electronic device 100 also includes a plurality of push buttons 102, a directional keypad 104 (e.g., a five-way key), and a speaker 106 carried by and/or positioned within the housing 101. In other embodiments, in addition to or in lieu of these components, the electronic device 100 can also include microphones, transceivers, photo sensors, and/or other computing components generally found in PDA devices, cellular phones, laptop computers, tablet PCs, smart phones, handheld email devices, or other mobile communication/computing devices.

As shown in FIG. 2, the electronic device 100 can include an input circuitry 110, an output circuitry 112, a processor 114, and a storage 116 operatively connected to one another, as shown in FIG. 2. The input circuitry 110 can include analog and/or digital signal controllers for sampling input signals from, e.g., the push buttons 102, the directional keypad 104, and/or the sensing component 109. For example, the input circuitry 110 can include a five-wire touch screen controller (Model No. ADS7845), supplied by Texas Instrument of Dallas, Tex., for controlling the sensing component 109.

The processor 114 can also include a microelectronic logic processor for processing signals supplied by the input circuitry 110 according to instructions stored in the storage 116, and outputting results to the output circuitry 112. A suitable processor 114 can be an OMAP 850 processor supplied by Texas Instruments of Dallas, Tex., running a Windows Mobile 6.0 operating system supplied by the Microsoft Corporation of Redmond, Wash.

The output circuitry 112 can include circuits and/or controllers for converting signals from the processor 114 to those suitable for output at, e.g., the speaker 106, the display 108, and/or other output devices. For example, the output circuitry 112 can include an LCD display controller (Model No. TMS470), supplied by Texas Instruments of Dallas, Tex., for controlling the display 108.

The storage 116 can include a hard drive, a flash ROM, an EPROM, and/or other suitable persistent computer-readable medium for storing instructions, records, and other data. For example, instructions for processing user input via the sensing component 109, as described in more detail below with reference to FIGS. 6-8, can be stored in the storage 116. These instructions can be at least partially incorporated into the operating system of the processor 114 or can be an independent application.

During use, the electronic device 100 can measure attributes of a touch and, in response, implement navigational functions based on the measured attributes. The navigational functions can include clicking, panning, continuous panning, scrolling, extended scrolling, accelerated scrolling, and/or other functions that can provide a user with a rendering of the desired user interface 120. In the embodiments described below, clicking, panning, continuous panning, scrolling, extended scrolling, and accelerated scrolling are used as examples for illustration purposes. In other embodiments, other navigational functions can be used in addition to or in lieu of these illustrated functions.

Referring to FIGS. 1 and 2 together, after the electronic device 100 is powered on, the processor 114 can command the input circuitry 110 to monitor input from a user via the sensing component 109. If the input circuitry 110 detects a touch on the sensing component 109, the processor 114 can indicate that a touch has been received; otherwise, the processor 114 can command the input circuitry 110 to continue monitoring for a touch.

If a touch is detected, the processor 114 can command the input circuitry 110 to measure certain parameters of the touch. For example, the input circuitry 110 can measure two-dimensional positions of the touch as a function of time and the duration of the detected touch. In certain embodiments, the input circuitry 110 can also measure a pressure, a temperature, and/or other aspects of the touch. The measured parameters can be temporarily stored in the storage 116 and/or other storage locations.

The processor 114 can then analyze the measured parameters based on instructions stored in the storage 116 to recognize a navigational input. For example, the processor 114 can compare the measured duration of the touch to a time threshold. If the duration is less than the time threshold, the processor 114 can recognize the touch as a first navigational input (e.g., a click), and in response, can perform a task (e.g., starting an application) corresponding to the first navigational input.

If the duration is longer than the time threshold, the processor 114 can recognize the touch as a second navigational input, e.g., an input for panning the user interface 120. The processor 114 can then pan the user interface 120 by displaying the next frame of the user interface 120 as long as the touch is not released.

While panning, the processor 114 can calculate a positional change of the touch as the input mechanism moves across the sensing component 109 by, e.g., differentiating the position of the touch with respect to time. In one embodiment, the positional change is calculated over the entire duration of the touch. In other embodiments, the positional change can be calculated over a period of time (e.g., 500 milliseconds) before the touch is released.

Once the touch is released, the processor 114 can compare the calculated positional change to a first positional threshold. If the positional change is above the first positional threshold, the processor 114 can recognize the released touch as a third navigational input, e.g., an input for scrolling. In response, the processor 114 can cause the user interface 120 to scroll, e.g., by sequentially displaying the next email message 125 in the message list 124 for a preselected period of time.

While the processor 114 causes the user interface 120 to scroll, the processor 114 can continue to monitor for another touch on the sensing component 109. If another touch is detected, the processor 114 can then calculate a positional change of the detected touch. If the calculated positional change is less than a second positional threshold, the processor 114 can recognize the new touch as a fourth navigational input, e.g., an input for stop scrolling. If the positional change exceeds the second positional threshold, the processor 114 can determine an elapsed time between the first touch and the second touch. If the elapsed time is less than a scrolling-time threshold (e.g., 1 second), the processor 114 can recognize the second touch as an input for accelerated scrolling to, e.g., scroll at a faster speed. If the elapsed time is greater than the scrolling-time threshold, the processor 114 can recognize the second touch as an input for extended scrolling.

In certain embodiments, the processor 114 can also monitor a location of the touch and recognize a navigational input based on the monitored location. For example, the processor 114 can compare the measured position of the touch relative to the position of the display 108. If the measured position of the touch is beyond the boundary of the display 108 (e.g., proximate to the first boundary portion 109a or the second boundary portion 109b of the sensing component 109), the processor 114 can recognize the input as a fifth navigational input, e.g., an input for continuous panning; otherwise, the processor 114 can recognize the touch as an input for panning.

In any of the embodiments described above, measuring parameters of the touch can include acquiring and buffering an input signal. For example, the processor 114 can cause the input circuitry 110 to acquire an input signal periodically over a period of time (e.g., 100 milliseconds) and store the acquired signals in a temporary storage (e.g., the storage 116). After the data acquisition period ends, the processor 114 can use the last acquired signal, an average of the acquired signals, and/or a signal derived from the stored signals as the input signal.

Several embodiments of the electronic device 100 can have a reduced number of navigational input devices at the surface of the electronic device 100. Instead, a user can directly navigate through different screens of the user interface 120 on the electronic device 100 by providing touches with different characteristics. The reduced number of navigational input devices can thus enable effective size reduction of the electronic device 100.

Several embodiments of the electronic device 100 can also provide more user-friendly navigation. According to conventional techniques, a user must view the user interface 120 and then redirect attention to input devices for providing navigational inputs. Such operation can be laborious. Thus, by allowing the user to view and navigate the user interface 120 at the display 108 and the sensing component 109, user satisfaction with operating the electronic device 100 can be improved.

Several embodiments of the electronic device 100 can also have improved signal recognition because the input signals are buffered. In conventional devices, input signals are typically unbuffered. As a result, the input signals may appear to be erratic because of, e.g., random noise, which can cause different input actions to be indistinguishable. Thus, by buffering the input signals, signal recognition can be improved by at least reducing random noise in the signals.

Even though the operation of the electronic device 100 is described above as recognizing navigational input based on positional and/or durational parameters of the touch, in other embodiments, the electronic device 100 can also recognize navigational input based on a temperature, a pressure, and/or other parameters of the touch. For example, the electronic device 100 can recognize navigational input based on the amount of pressure applied to the sensing component 109.

C. Methods of Operating Electronic Devices

Figure 3:
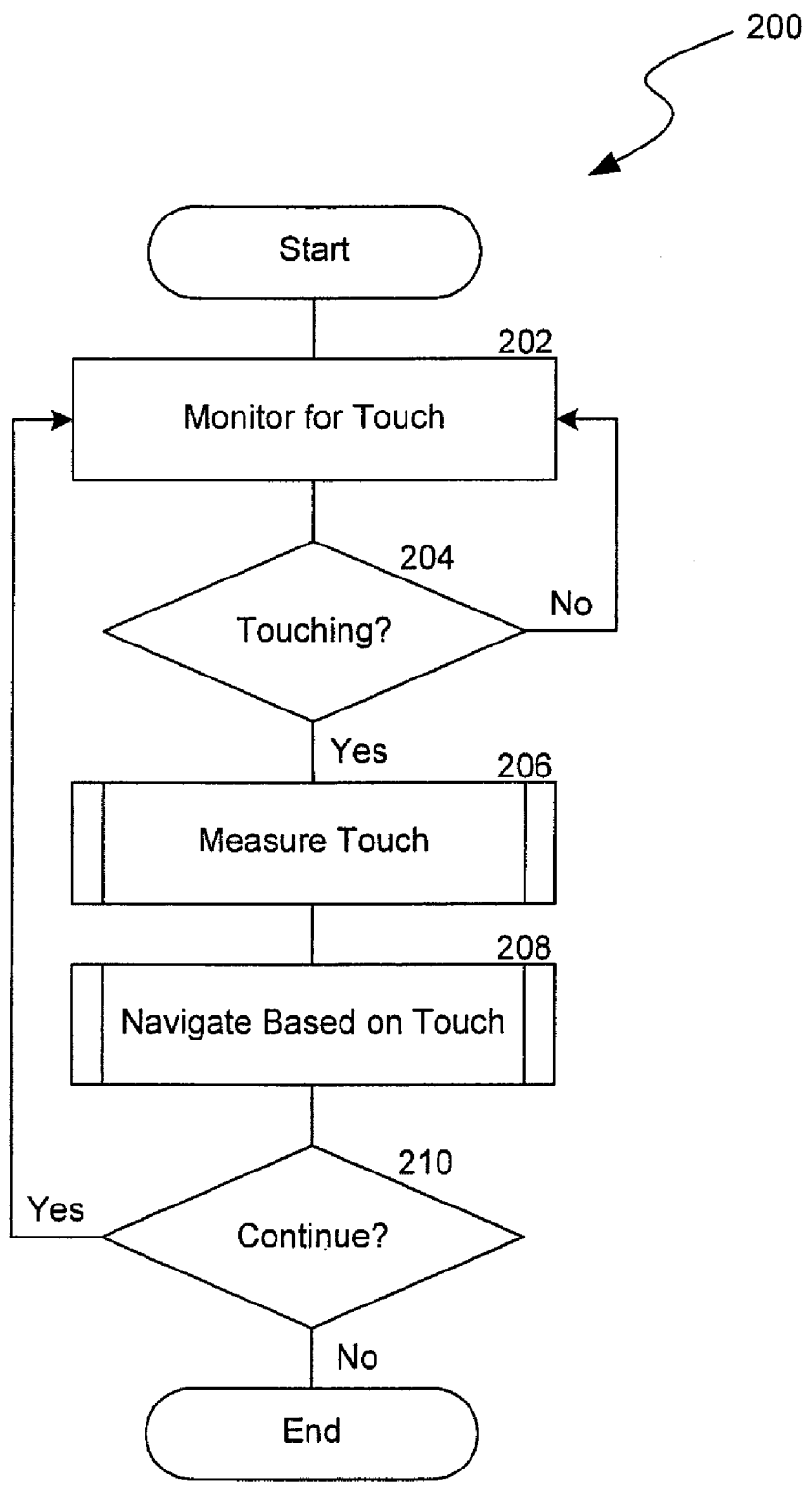
FIG. 3 is a flow chart illustrating a method of operating an electronic device with touch-sensitive navigational mechanisms and configured in accordance with an embodiment of the invention.

FIG. 3 is a flow chart illustrating a method 200 of operating an electronic device with touch-sensitive navigational mechanisms and configured in accordance with an embodiment of the invention. The method 200 can be implemented as a computer program stored in, for example, the storage 116 of the electronic device 100 for execution by the processor 114 of FIG. 2. The method 200 can also be implemented as one or more computer modules or routines at least partially incorporated into the operating system of the processor 114.

The method 200 can include monitoring for a touch from an input mechanism (block 202). A decision is then made at block 204 to determine whether a touch has been detected. If a touch is indicated, the process continues to measure the touch (block 206); otherwise, the process reverts to monitoring for a touch at block 202. Measuring the touch can include quantifying parameters of the touch. For example, in one embodiment, the parameters can include two-dimensional coordinates of the touch as a function of time when a resistive touch screen is used to measure the touch. The measured coordinates can be recorded as follows:

$$p_i = (x_i, y_i, t_i)$$

where $t_i$ is the time at which the coordinates are measured. In another embodiment, the parameters can include the number and locations of active cells when a capacitive touch screen is used to measure the touch. In further embodiments, the parameters can also include pressure, temperature, bio-resistance, bio-conductance, and/or other parameters of the touch.

The method 200 can also include navigating the user interface 120 (FIG. 1) based on the measured touch (block 208). For example, the parameters of the touch can be analyzed to characterize the touch, and based on the characteristics of the touch, the user interface 120 can be navigated accordingly. Several embodiments of navigating the user interface 120 are described below in more detail with reference to FIGS. 4-7.

The method 200 can further include a decision at block 210 to determine whether the process is continued. The decision can be based on the current operating state of the electronic device. For example, if the electronic device is currently shutting down, then the process ends; otherwise, the process reverts to monitoring for a touch from an input mechanism at block 202.

Figure 4:
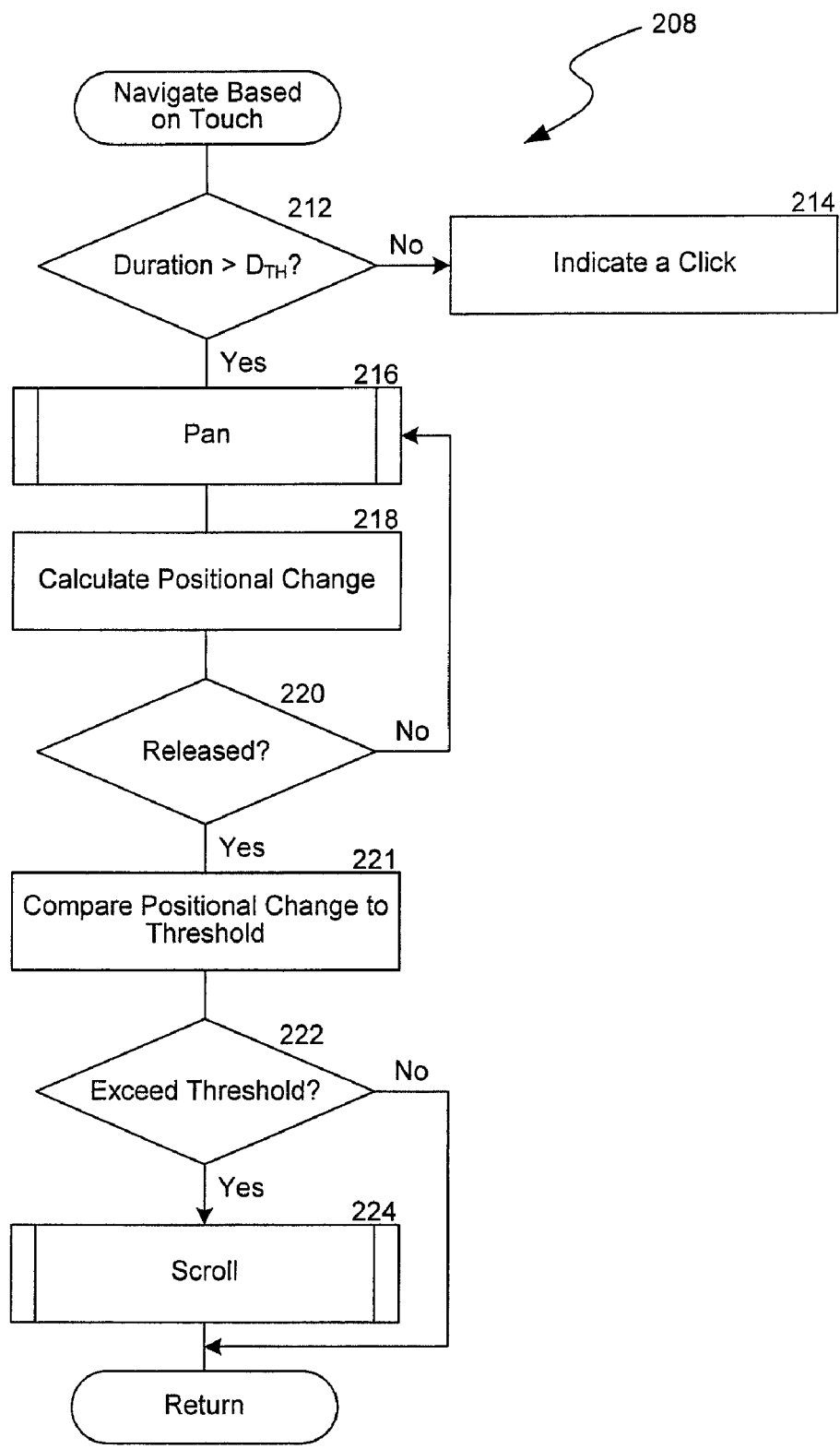
FIG. 4 is a flow chart illustrating a method of navigating based on touch suitable for use in the method of FIG. 3.

FIG. 4 is a flow chart illustrating one embodiment of a method 208 of navigating based on a touch suitable for use in the method of FIG. 3. The method 208 can include a decision at block 212 to compare a duration of the touch to a time threshold ($D_{TH}$). If the duration of the touch is not greater than the time threshold, the touch can be indicated as a click (block 214). The electronic device can then operate in response to the indicated click to, e.g., open a file, start an application, or perform other operations.

If the duration of the touch is greater than the time threshold, the touch can be indicated as an input for panning (block 216). In response, the user interface 120 can be panned once or can be continuously panned as described in more detail below with reference to FIG. 6. "Panning," as used herein, generally refers to unidirectional (e.g., horizontal or vertical) shifting of an entire screen of a display (e.g., the user interface 120). As a result, in the example of the electronic device 100, panning the user interface 120 can cause the electronic device 100 to display the next "page" of the massage list 124.

Figure 5:
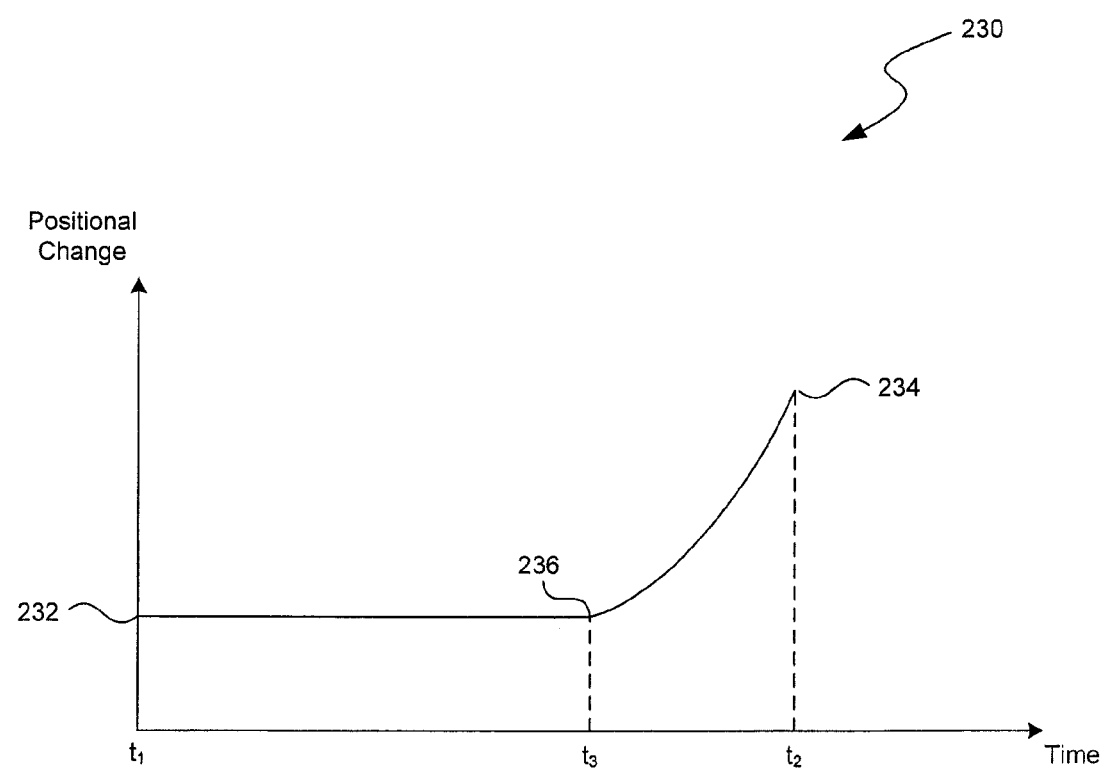
FIG. 5 is a positional change v. time chart illustrating one example of operating an electronic device according to the method of FIG. 4.

The method 208 can also include calculating a positional change of the touch (218). FIG. 5 is a position v. time chart 230 illustrating one example of calculating the positional change. As shown in FIG. 5, the chart includes a starting point 232 ($t_1$) at which the touch is first detected and an end point 234 ($t_2$) at which the touch is released. In one embodiment, calculating the positional change includes subtracting the coordinates measured at the starting point 232 from those measured at the end point 234. In another embodiment, calculating the positional change can include subtracting the coordinates measured at an intermediate point 236 ($t_3$) from those measured at the end point 234. The intermediate point 236 can be offset from the end point by a preselected amount (e.g., 500 milliseconds).

Even though the position between the starting point 232 and the intermediate point 236 is shown to be constant and liner in FIG. 5, in certain embodiments, the measured position can fluctuate around an average value. In these embodiments, if the fluctuation is within a preselected threshold (e.g., within a percentage of the measured position), the measured position can be considered constant and equal to the average value; otherwise, the measured position can be used to calculate the position change as discussed above.

Referring back to FIG. 4, after the positional change is calculated, a decision can be made at block 220 to determine whether the touch has been released. If the touch is not released, the process reverts to panning at block 216; otherwise, the calculated positional change can be compared to a threshold (block 221). The method 208 can further determine whether the positional change exceeds the threshold (block 222). If the positional change exceeds the threshold, the touch can be indicated as an input for scrolling (block 224); otherwise, the process returns. "Scrolling," as used herein, generally refers to an act of sliding a horizontal or vertical presentation text, drawings, images, and/or other content across a screen. As a result, in the example of the electronic device 100, scrolling the user interface 120 can cause the electronic device 100 to slide each of the email messages 125 vertically across the display 108. Further details of the scrolling operation is described below with reference to FIG. 7.

Figure 6:
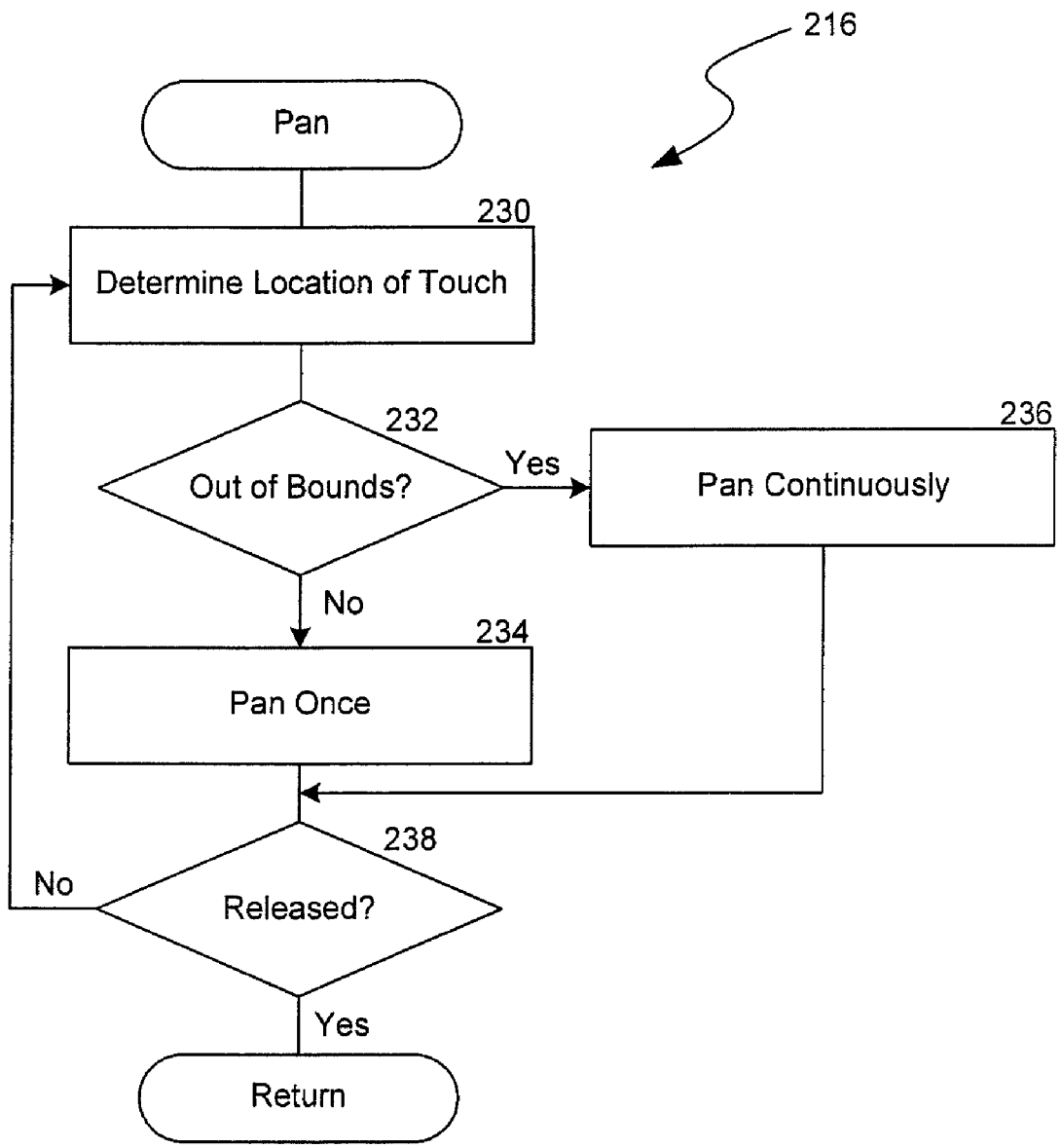
FIG. 6 is a flow chart illustrating a method of panning suitable for use in the method of FIG. 3.

FIG. 6 is a flow chart illustrating a method 216 of panning suitable for use in the method of FIG. 3. The method 216 can include determining the location of the touch in relation to the display 108 (FIG. 1) at block 230. A decision is then made at block 232 to determine whether the location of the touch is out of bounds from the display 108. If the touch is out of bounds, e.g., proximate to any one of the boundary portions 109a-d of the sensing component 109, then the method 216 can include indicating the touch as an input for continuous panning (block 236). If the touch is not out of bounds, then the method 216 can include indicating the touch as an input for panning once. Then, a decision can be made at block 238 to determine whether the touch is released. If the touch is not released, the process reverts to determining the location of the touch at block 230; otherwise, the process returns.

Figure 7:
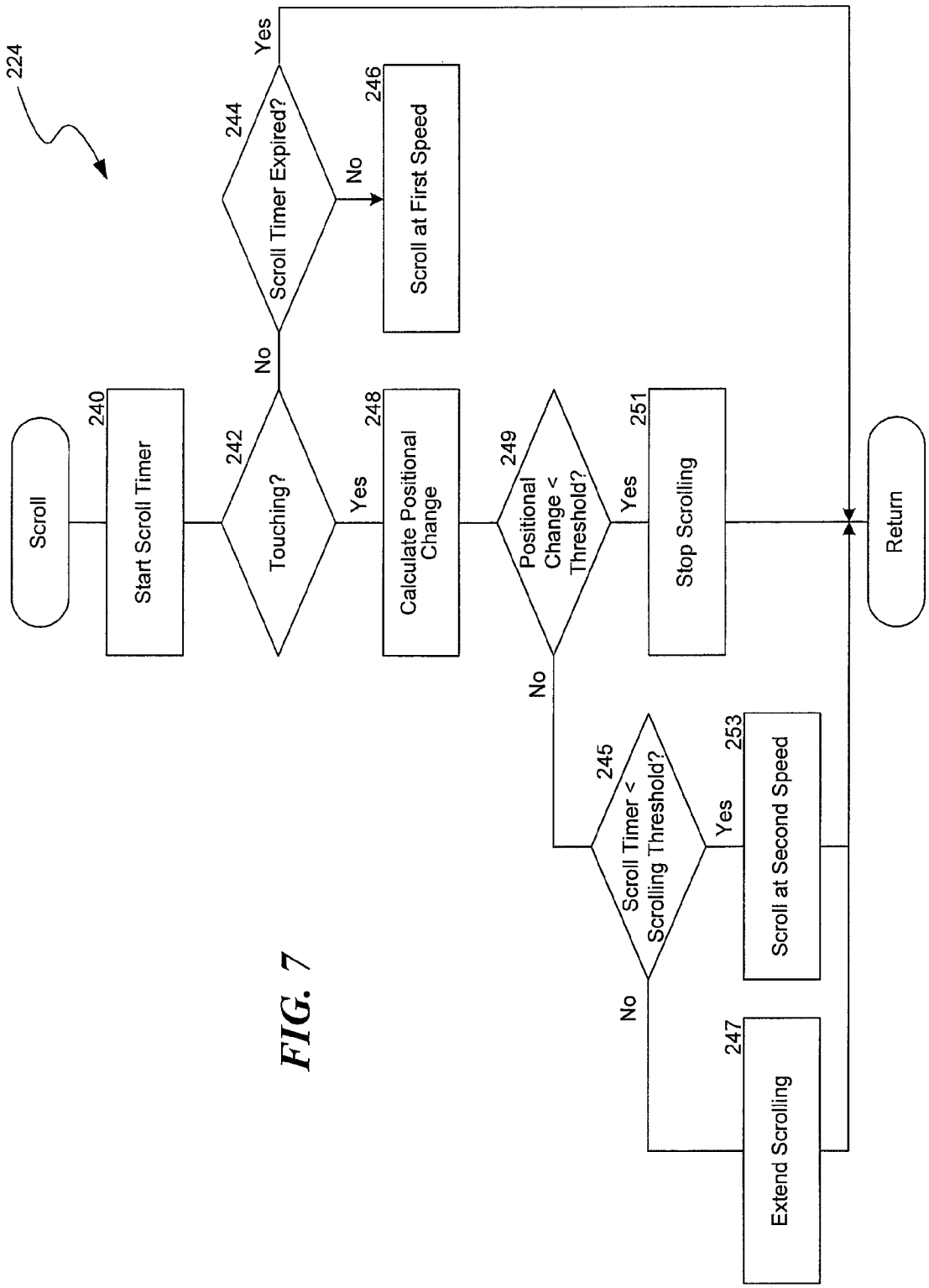
FIG. 7 is a flow chart illustrating a method of scrolling suitable for use in the method of FIG. 3.

FIG. 7 is a flow chart illustrating a method 224 of scrolling suitable for use in the method of FIG. 3. The method 224 can include starting a scroll timer at block 240. The method 224 can also include determining whether a touch has been detected after the scroll timer is started (block 242). If no touch is detected, the method 224 can include determining whether the scroll timer has expired at block 244. If the scroll timer is not expired, then the method 224 can include scrolling at a first speed (block 246); otherwise, the process returns.

If a touch is detected after the scroll timer is started, the method 224 can include calculating a positional change of the touch (block 248). If the calculated positional change is less than a threshold (block 249), the method 224 can include stop scrolling (block 251). If the positional change is greater than the threshold, in one embodiment, the process includes determining an elapsed time between the first touch and the second touch by, e.g., determining an accumulated time in the scroll timer. If the elapsed time is less than a scrolling-time threshold (e.g., 1 second), the process can include accelerated scrolling by, e.g., scrolling at a second speed faster than the first speed (block 253). In one embodiment, the second speed is twice the first speed. In other embodiments, the second speed can be any speed that is greater than the first speed. If the elapsed time is greater than the scrolling-time threshold, the process can include extended scrolling by, e.g., extending the time period of scrolling at the first speed by resetting the scroll timer and/or other suitable techniques.

Figure 8:
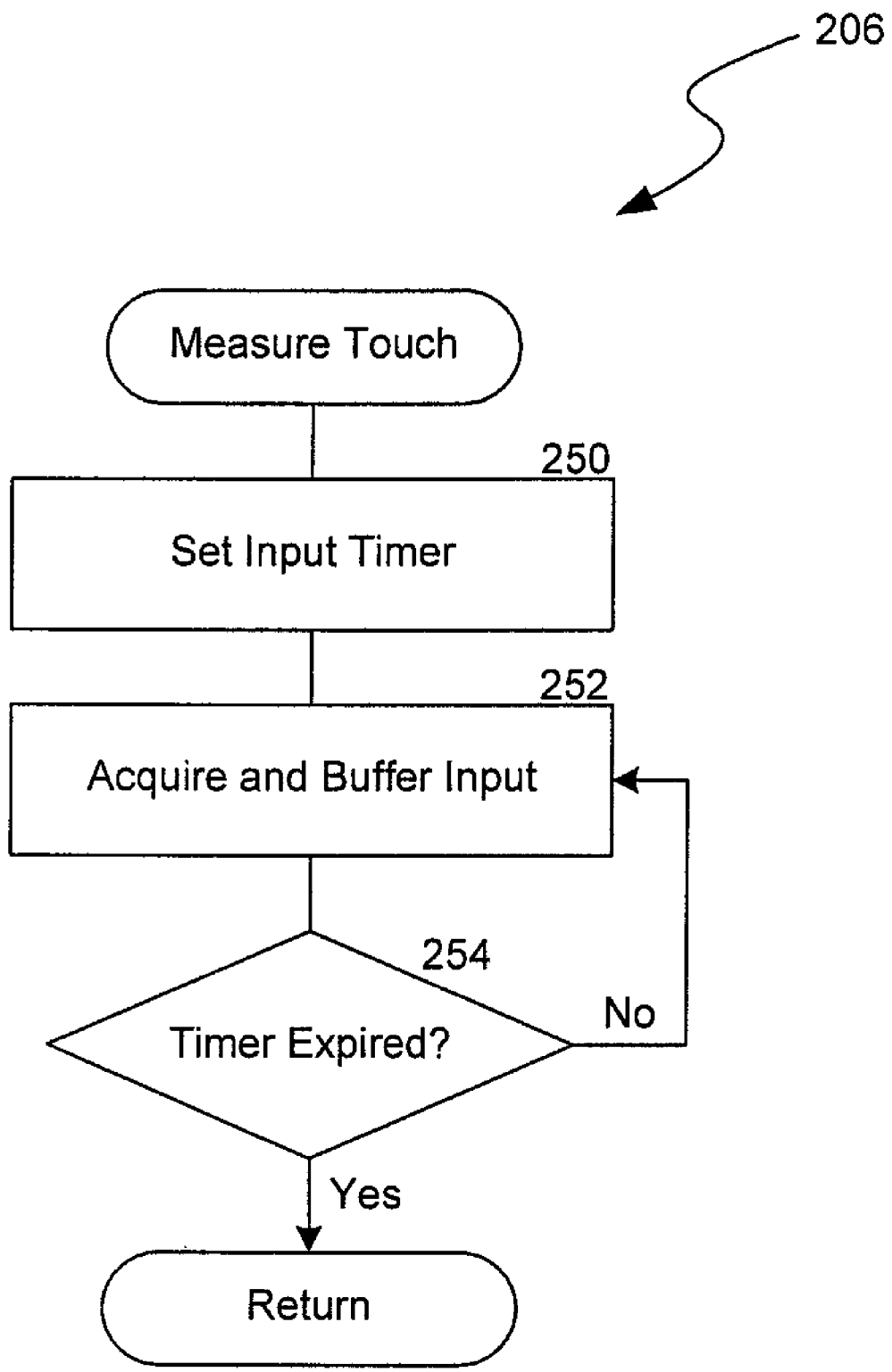
FIG. 8 is a flow chart illustrating a method of measuring a touch suitable for use in the method of FIG. 3.

FIG. 8 is a flow chart illustrating a method 206 of measuring a touch suitable for use in the method of FIG. 3. The method 206 can include setting an input timer (block 250). The method 206 can also include acquiring and buffering an input signal (block 252). The method 206 can then include a decision block 254 to determine whether the input timer has expired. If the input timer has not expired, the process reverts to acquiring and buffering the input signal at block 252; otherwise, the process returns.

From the foregoing, it will be appreciated that specific embodiments of the invention have been described herein for purposes of illustration, but that various modifications may be made without deviating from the invention. The electronic devices can also include additional components attached to the housing 101, such as a reserve battery compartment, jog wheels, and/or other electronic components. Certain aspects of the invention described in the context of particular embodiments may be combined or eliminated in other embodiments. For example, the directional keypad 104 and/or the push buttons 102 can be omitted from the electronic device 100 in certain embodiments. Further, while advantages associated with certain embodiments of the invention have been described in the context of those embodiments, other embodiments may also exhibit such advantages, and not all embodiments need necessarily exhibit such advantages to fall within the scope of the invention. Accordingly, the invention is not limited except as by the appended claims.

We claim:

1. An electronic device, comprising:
   a display configured to present a user interface to a user;
   a sensing component configured to sense a first touch and a second touch from an input mechanism;
   an input circuitry configured to measure at least one parameter of the first touch and the second touch via the sensing component, wherein the at least one parameter includes a duration of the first touch and a positional change of the first touch and the second touch and wherein the second touch is distinct from the first touch; and
   a processor configured to:
      perform an analysis of the measured at least one parameter of the first touch,
      based on the analysis, recognize the first touch as an input for scrolling when the determined duration is greater than a duration threshold and the positional change is greater than a first positional threshold;
      cause the user interface to navigate on the display based on the performed analysis;
      commence a scroll timer upon recognizing the first touch as an input for scrolling, wherein the user interface ceases to scroll at an expiration of the scroll timer;
      when the second touch is while the user interface is scrolling, compare the positional change of the second detected touch to a second positional threshold;
      measure an elapsed time between commencing the scroll timer and detecting the second touch;
      when the elapsed time is less than a scrolling threshold, change a speed of the scrolling based on the comparison of the positional change of the second touch to the second positional threshold; and
      when the elapsed time is greater than the scrolling threshold, extend the scroll timer.

2. The electronic device of claim 1, further comprising a storage configured to hold instructions for performing the analysis of the measured at least one parameter and causing the user interface to navigate on the display based on the performed analysis.

3. The electronic device of claim 1 wherein the sensing component includes at least one of a resistive touch screen, a capacitive touch screen, an infrared touch screen, a surface acoustic wave touch screen, a pressure sensor, and a temperature sensor.

4. The electronic device of claim 1 wherein the processor is configured to compare the measured duration to the duration threshold and indicates that the first touch is a click when the measured duration is less than the duration threshold.

5. The electronic device of claim 1 wherein the input circuitry is configured to measure a position of the first touch, and wherein the processor is configured to compare the measured duration to the duration threshold, compare the position to a location of the display, and indicate that the first touch is an input for continuous panning when the measured duration is greater than the duration threshold and the measured position extends beyond the display.

6. The electronic device of claim 1 wherein the processor is configured to indicate an input for stopping scrolling in response to determining that the positional change of the second touch is less than a second threshold.

7. A method for operating an electronic device, comprising:
measuring at least one parameter of a first detected touch from an input mechanism on a sensing component of the electronic device, wherein measuring the at least one parameter of the first detected touch includes determining a duration of the first detected touch and determining a positional change of the first detected touch;
performing an analysis of the measured at least one parameter of the first detected touch from the input mechanism;
based on the analysis, recognizing the first detected touch as an input for scrolling when the determined duration is greater than a duration threshold and the positional change is greater than a first positional threshold;
causing the user interface to scroll on a display of the electronic device based on the performed analysis;
commencing a scroll timer upon recognizing the first detected touch as an input for scrolling, wherein the user interface ceases to scroll at an expiration of the scroll timer;
while the user interface is scrolling, measuring at least one parameter of a second detected touch from the input mechanism, wherein the second detected touch is distinct from the first detected touch and wherein measuring the at least one parameter of the second detected touch includes determining a positional change of the second detected touch;
comparing the positional change of the second detected touch to a second positional threshold;
measuring an elapsed time between commencing the scroll timer and detecting the second detected touch;
when the elapsed time is less than a scrolling threshold, changing a speed of the scrolling based on the comparison; and
when the elapsed time is greater than the scrolling threshold, extending the scroll timer.

8. The method of claim 7, further comprising detecting the first touch from the input mechanism before measuring at least one parameter of the detected touch.

9. The method of claim 7 wherein measuring at least one parameter of the first detected touch includes measuring one or more of a position, a pressure, a temperature of the touch.

10. The method of claim 7 wherein measuring at least one parameter of the first touch includes measuring a position of the first detected touch, and wherein the method further includes
comparing the measured duration to a threshold;
comparing the position to a location of the display; and
indicating that the first detected touch is an input for continuous panning when the measured duration is greater than the threshold and the measured position extends beyond the display.

11. The method of claim 7 wherein changing the speed of the scrolling comprises:
indicating an input for stopping scrolling when the calculated positional change of the second detected touch is less than the second positional threshold.

12. The method of claim 7 wherein measuring at least one parameter of the first detected touch includes sampling and buffering an input signal of the at least one parameter for a preselected period of time.

13. A non-transitory computer-readable medium containing instructions for performing the method of claim 7.

14. A method for operating an electronic device, comprising:
detecting a first touch from an input mechanism on a sensing component of the electronic device;
measuring at least one parameter of the first detected touch, wherein measuring the at least one parameter of the first detected touch includes determining a duration of the first detected touch and determining a positional change of the first detected touch;
recognizing the first detected touch as a signal for scrolling when the determined duration is greater than a duration threshold and the positional change is greater than a first positional threshold;
causing a user interface to scroll on a display of the electronic device based on the recognized signal for scrolling;
commencing a scroll timer upon recognizing the first detected touch as a signal for scrolling, wherein the user interface ceases to scroll at an expiration of the scroll timer;
while the user interface is scrolling, measuring at least one parameter of a second detected touch from the input mechanism, wherein the second detected touch is distinct from the first detected touch and wherein measuring the at least one parameter of the second detected touch includes determining a positional change of the second detected touch;
comparing the positional change of the second detected touch to a second positional threshold;
measuring an elapsed time between commencing the scroll timer and detecting the second detected touch;
when the elapsed time is less than a scrolling threshold, changing a speed of the scrolling based on the comparison; and
when the elapsed time is greater than the scrolling threshold, extending the scroll timer.

15. The method of claim 14 wherein recognizing the first detected touch includes indicating the touch as an input for clicking when the determined duration is less than the duration threshold.

16. The method of claim 14 wherein changing a speed of the scrolling includes stopping scrolling in response to determining that the positional change of the second detected touch is less than the second positional threshold.

17. The method of claim 14 wherein determining at least one characteristic of the first detected touch includes sampling and buffering input signals of at least one parameter of the first detected touch.

18. A non-transitory computer-readable medium containing instructions for performing the method of claim 14.

* * * * *

UNITED STATES PATENT AND TRADEMARK OFFICE
CERTIFICATE OF CORRECTION

PATENT NO.       : 8,120,586 B2  
APPLICATION NO.  : 11/850573  
DATED            : February 21, 2012  
INVENTOR(S)      : Chih-Feng Hsu et al.

It is certified that error appears in the above-identified patent and that said Letters Patent is hereby corrected as shown below:

In column 8, line 43, in claim 1, before "while" insert -- detected --.

In column 8, line 45, in claim 1, before "touch" delete "detected".

In column 9, line 55, in claim 9, before "a temperature" insert -- and --.

Signed and Sealed this  
Twenty-ninth Day of May, 2012

David J. Kappos  
*Director of the United States Patent and Trademark Office*